April 17, 1962 R. J. SCHRADER 3,030,322
METHOD OF MIXING POLYMERIC HYDROCARBONS AND WAXES
Filed Dec. 12, 1957
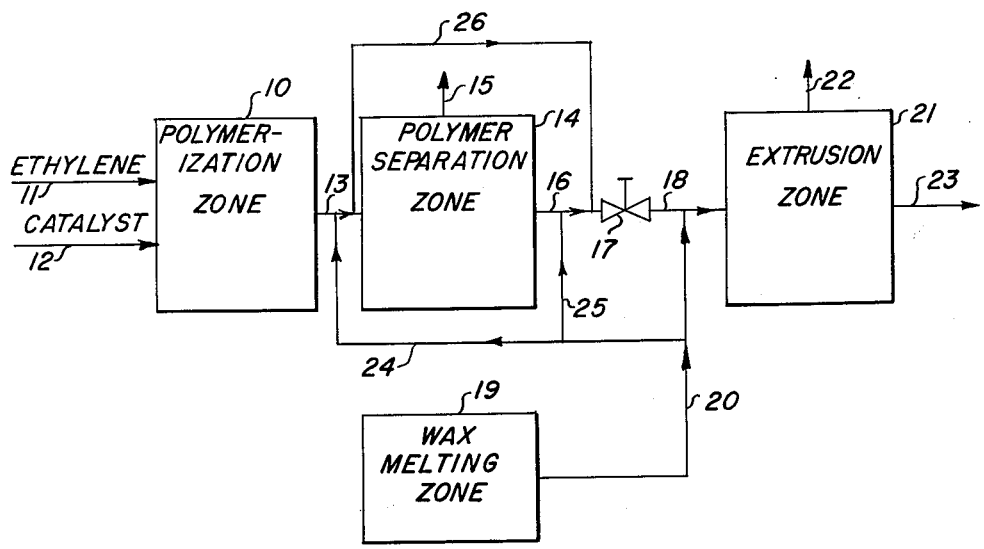
ROBERT J. SCHRADER
INVENTOR.
BY
ATTORNEYS United States Patent Office 3,030,322
Patented Apr. 17, 1962

3,030,322
METHOD OF MIXING POLYMERIC HYDRO-
CARBONS AND WAXES
Robert J. Schrader, Longview, Tex., assignor to Eastman
Kodak Company, Rochester, N.Y., a corporation of
New Jersey
Filed Dec. 12, 1957, Ser. No. 702,288
11 Claims. (Cl. 260—28.5)

This invention relates to an improved method for producing plastic blends of high molecular weight polymeric hydrocarbons and waxes. In a specific aspect this invention relates to an improved process for producing plastic blends of high molecular weight solid polyethylene and hydrocarbon waxes.

It is known that liquid to solid polymers can be prepared by polymerizing unsaturated aliphatic hydrocarbons such as ethylene and its homologs at controlled temperatures and under superatmospheric pressures in the presence of certain polymerization catalysts. The polymerization reaction can be carried out in the presence of an aqueous or an organic reaction medium and in some instances the liquified unsaturated olefinic hydrocarbon forms the medium for the reaction. It is also known that the incorporation of certain waxes into the polymeric hydrocarbons imparts improved properties to the hydrocarbon and results in a blend having desirable properties. Plastic homogeneous mixtures or blends of waxes with polymeric hydrocarbons have been recommended for many commercial uses. Among these many important uses are included a large variety of molded articles, water-proof coating compositions, gas-proof and water-proof sheets and envelopes as well as wrapping cartons. These uses represent only a limited enumeration of the large number of uses to which blends of polymeric hydrocarbons and waxes have been put.

One of the problems that has been encountered in the formation of blends of waxes and polymeric hydrocarbons involves the procedure employed for forming the mixture. It has been suggested that the waxes and polymeric hydrocarbons can be homogeneously mixed in equipment such as extruders or other types of mixing apparatus. However, it has been found that when such apparatus is employed in the mixing operation the wax tends to make the surface of the extruder or other mixing apparatus so slippery that uneven extrusion and in some instances no mixing at all is realized. Another suggested solution for this mixing problem involves the incorporation of the wax into the reactor during polymerization of the unsaturated hydrocarbon and the wax is present in the reactor throughout the polymerization. This procedure may result in rather homogeneous blends of wax and polymeric hydrocarbon but the wax tends to increase the viscosity of the polymerization reaction medium and thus to increase the difficulties in carrying out the polymerization reaction. Also the wax must be handled throughout the polymerization reaction and it thus tends to increase the overall costs of producing the polymer. Another suggested solution to the mixing problem involves the mixing of the polymeric hydrocarbon and wax while incorporating a metallic halide, such as aluminum chloride, into the blend during agitation. The presence of the metallic halide, of course, adds to the cost of the blend and it is also an impurity whose presence can in some instances be quite undesirable.

It is an object of this invention to provide a novel and improved procedure for mixing high molecular weight solid polymeric hydrocarbons and waxes. It is another object of this invention to provide a novel and improved process for mixing high molecular weight solid polyethylene and waxes wherein the difficulties encountered in the prior art procedures are easily avoided.

In accordance with this invention it has been found that the difficulties encountered in the prior art in mixing solid high molecular weight polymeric hydrocarbons and waxes can be eliminated by adding the wax to the polymeric hydrocarbon while the polymer is in an agitated condition and in the presence of unpolymerized hydrocarbon monomer subsequent to the polymerization reaction and prior to homogenization of the wax and polymer. As a consequence of this method of addition of the wax it is possible to produce a highly homogeneous mixture of wax and polymeric hydrocarbon that can then be formed into pellets, spheres, rods, or other suitable form for marketing.

The olefinically unsaturated aliphatic hydrocarbons that are employed to produce the solid polymers for use in this process ordinarily contain from 2 to 10 carbon atoms. Ethylene is the preferred olefinic hydrocarbon but it is possible to produce solid polymeric materials from other olefinic hydrocarbons such as propylene, n-butylene, isobutylene, the pentenes, the hexenes and the like. Ordinarily the olefinic hydrocarbons are of the monoolefinic type containing the unsaturated bond in the α-position.

The olefinically unsaturated hydrocarbon is polymerized in the presence of a suitable polymerization catalyst. Among the catalysts that can be used are molecular oxygen and the per-oxygen and peroxide compounds, such as lauroyl peroxide, ditertiarybutyl peroxide, ammonium persulfate, sodium perborate, benzoyl peroxide, furoyl peroxide, diethyl peroxide, tertiary butyl hydroperoxide, benzoperacid, furoperacid and acetoperacid.

In addition to the above-mentioned catalysts the polymerization reaction can be carried out in the presence of catalysts such as diisopropyl peroxy dicarbonate, diisoamylperoxy dicarbonate, pivalyl peroxide, methoxymethylhyponitrite and a mixture comprising tetraethyl tetrazine and lauroyl peroxide. All of the above-mentioned catalysts are quite useful for polymerizing unsaturated hydrocarbons at comparatively high pressures. When it is desired to employ lower pressures, it is possible to use as catalysts for the reaction mixtures such as aluminum trialkyl and titanium tetrahalide, aluminum trialkyl and vanadium trihalide, aluminum metal and titanium tetrahalide as well as metal oxide catalysts such as chromium oxide and silicon oxide deposited on activated alumina and either molybdenum oxide or vanadium pentoxide deposited on activated alumina.

The amount of catalyst that is necessary to affect the polymerization reaction is subject to considerable variation and usually falls within the range of 0.01–10% by weight of the reaction mixture. The polymerization reaction can be carried out in the presence of an aqueous medium and in some instances it is desirable to carry out the reaction in the presence of normally liquid inert hydrocarbons. Among the hydrocarbons that can be used are the aliphatic, cycloaliphatic and aromatic types, such as pentane, hexane, heptane, octane, cyclohexane, benzene, toluene, xylene and the like. It is also possible to use halogenated derivatives of the above-mentioned hydrocarbons. The polymerization reaction is carried out at a temperature within the range of 20–300° C. with temperatures of 40–260° C. being preferred. The reaction pressure is substantially above atmospheric pressure and it can vary from about 200 or 300 p.s.i.g. to about 30,000 p.s.i.g. The polymerization reaction is conducted for a period of time sufficient to produce a reaction mixture containing from about 1–50% by weight of polymeric hydrocarbon. It is generally preferred to carry out the reaction in such a manner that the concentration of polymeric hydrocarbon in the reaction mixture does not exceed about 25% by weight.

The polymerization reaction can be conducted either in a continuous manner or in a batchwise procedure in order to obtain uniform production of polymeric hydrocarbons having substantially similar properties. It is usually preferred to conduct the reaction in a continuous procedure. After the polymeric hydrocarbon has been formed the reaction mixture is removed from the polymerization reaction zone to a separating zone where the polymeric hydrocarbon is separated from the reaction mixture. The separation can be effected by means of filtering, centrifuging or any other means of separating the polymeric hydrocarbon. The separation of polymeric hydrocarbon is effected at superatmospheric pressures which usually are somewhat lower than the pressures employed for the polymerization reaction.

The polymeric hydrocarbon produced in this manner, which contains a substantial amount of dissolved monomer, is then conducted to a mixing or homogenizing zone where the polymeric hydrocarbon and wax are mixed or homogenized to form the desired blend. In practicing this invention, prior to the introduction of the polymeric hydrocarbon to the homogenizing zone, the pressure on the polymeric hydrocarbon is reduced substantially and usually to about atmospheric pressure, and as a result of this reduction in pressure, unreacted hydrocarbon monomer, for example ethylene, dissolved in the polymeric hydrocarbon is flashed to form a gas. In one of the preferred methods of carrying out my invention, immediately subsequent to the reduction in pressure molten wax is added to the polymeric hydrocarbon. As a result of the reduction in pressure and the addition of the molten wax, a three-component mixture is formed consisting of unreacted hydrocarbon monomer, polymeric hydrocarbon and wax. Also the flashing of the unreacted hydrocarbon monomer creates considerable turbulence in the three-component mixture causing the polymeric hydrocarbon and molten wax to be uniformly mixed to form a blend that can then be homogenized and pelleted into a desirable form.

In general the wax that is employed to form the polymeric hydrocarbon-wax blend of this invention has a melting point in the range of about 90° F. to 230° F. This type of wax includes substances such as crystalline paraffin wax, the amorphous paraffinic waxes, for example, petrolatum, high melting point waxes, carnauba wax and various other waxes of synthetic, mineral, vegetable and animal origin, for example, montan wax, beeswax, candelilla wax and the like. For the practice of this invention it is preferred to use a microcrystalline wax or a synthetic wax prepared by the reaction of hydrogen and carbon monoxide in the so-called Fischer-Tropsch process. Such waxes can have a melting point within the range of 180–220° F. and higher and these waxes have been found to be quite suitable for blending with polymeric hydrocarbons.

The FIGURE represents a schematic drawing of a preferred procedure for carrying out this invention. Referring now to the accompanying drawing ethylene and a polymerization catalyst are introduced to polymerization zone 10 via lines 11 and 12 respectively. In polymerization zone 10 ethylene is reacted under superatmospheric pressure and preferably in the presence of a peroxy type of catalyst, e.g. ditertiary butyl perbenzoate, to form polyethylene. The resulting reaction mixture containing the polyethylene is withdrawn from zone 10 via line 13 and passed to polymer separation zone 14 where the polyethylene is separated from the reaction mixture under a superatmospheric pressure somewhat lower than the pressure employed in zone 10. The polyethylene-free reaction mixture is removed from zone 14 via line 15. The separated polyethylene which at the superatmospheric pressure employed contains unreacted dissolved ethylene is removed from zone 14 via line 16 and passed through pressure-reducing valve 17 where the pressure on the polyethylene is reduced to substantially atmospheric pressure. As a result of the reduction in pressure the ethylene passing via line 16 is flashed to form gaseous ethylene in line 18 and thus causing considerable turbulence in line 18. A synthetic wax prepared in the Fischer-Tropsch process and having a melting point of 210–230° F. is melted in wax melting zone 19 and passed via line 20 into line 18 where the wax and polyethylene in line 18 are mixed. As a result of the high velocity and turbulence imparted to the polyethylene and wax in line 18 by the ethylene as it is being flashed excellent mixing of the polyethylene and wax is realized. The mixture enters zone 21 via line 18 at a relatively high velocity and usually in a tangential manner. Unreacted gaseous ethylene is removed from zone 21 via line 22 and the homogeneous mixture of polyethylene and wax is withdrawn from extrusion zone 21 via line 23. The extruded mixture can then be cut or in some other manner subdivided into pellets and the like. If desired, compounding rolls, kneaders, masticators, and like can be used in place of an extruder in zone 21.

This invention is further illustrated by the following specific example:

Ethylene containing 0.06% oxygen was compressed at 1500 atmospheres and forced at this pressure through a steel reaction vessel maintained at a temperature of 230° C. After passing through the reaction space the ethylene and polymer formed were released through a suitable valve to another steel vessel held at 225 atmospheres pressure in which the unreacted ethylene separated from the liquid polymer. The polymer which is in equilibrium with ethylene at 225 atmospheres is then passed to an extrusion zone through a control valve. Molten micro-crystalline wax is pumped by means of a heated gear pump into the line between this control valve and the extrusion zone. The mixture of polyethylene and wax enters the extrusion zone as a uniform blend. From the extrusion zone the molten mixture is passed to suitable pelleting apparatus.

It has been found that a blend of micro-crystalline wax and polyethylene produced in this manner is so thoroughly mixed that it is impossible to tell that another material has been added to the polyethylene by any physical means such as extrusion of film, injection molding, paper coating, wire covering and other similar processes.

In practicing this invention the wax is added to the polymeric hydrocarbon while the polymer is in a state of agitation, e.g. in a moving stream, and while the polymer is in the presence of unpolymerized hydrocarbon monomer. It is undesirable to add the wax to polymerization zone 10 since the polymer in zone 10 is usually in a quiescent condition and uniform mixing of the polymer and wax is not obtained. In order to obtain the desirable mixing of wax and polymer, the wax is added to the polymer prior to introduction to extrusion or homogenization zone 21. The preferred method of wax addition involves adding molten wax to the moving stream of polymer in line 18. However, if desired, molten wax can also be added to the moving stream of polymer in line 13 via line 24. Alternatively, wax can be added to the moving stream of polymer in line 16 via line 25. Using any of the various methods of wax addition, the mixture passing via line 18 is a three-component system, and the gaseous ethylene in line 18 causes considerable turbulence and uniform mixing of the wax and polymer.

In some instances it is not necessary to employ separation zone 14 in my process. In that event reaction mixture containing polymeric hydrocarbon is withdrawn from zone 10 via line 13 and passed via lines 26 and 16 and then to zone 22 in the manner described above.

It is an outstanding feature of my invention that a thorough and complete homogenizing of the wax and polymeric hydrocarbon is obtained. In fact the mixing is accomplished so effectively that it is virtually impossible to determine from the product that any wax has been added to the polymeric hydrocarbon. The amount of wax that is used in practicing my invention can be within the range of 0 to 200% by weight of the polymeric hydrocarbon.

I claim:
1. In the process for the production of a homogeneous mixture of wax and solid polymeric hydrocarbon wherein an α-monoolefinically, unsaturated, aliphatic hydrocarbon is polymerized in the presence of a polymerization catalyst at a superatmospheric pressure, and polymer thus formed and wax are homogenized to form an intimate admixture, the improvement which comprises introducing molten wax to said polymer in the presence of unpolymerized, α-monoolefinically, unsaturated, aliphatic hydrocarbon and reducing the pressure on resulting mixture whereby unpolymerized, α-monoolefinically, unsaturated, aliphatic hydrocarbon in said mixture is vaporized and agitates said mixture.

2. The improved process for producing a homogeneous mixture of solid, high molecular weight polymeric hydrocarbon and wax which comprises polymerizing an α-monoolefinically, unsaturated, aliphatic hydrocarbon in the presence of a polymerization catalyst at a superatmospheric pressure, reducing the pressure on the resulting mixture of polymeric hydrocarbon and dissolved unpolymerized α-monoolefinically, unsaturated, aliphatic hydrocarbon to substantially atmospheric pressure to vaporize said unpolymerized α-monoolefinically, unsaturated, aliphatic hydrocarbon and immediately thereafter adding molten wax to said resulting mixture at reduced pressure as dissolved unpolymerized α-monoolefinically, unsaturated, aliphatic hydrocarbon vaporizes.

3. The improved process for producing a homogeneous mixture of solid, high molecular weight polymeric hydrocarbon and wax which comprises polymerizing ethylene in the presence of a polymerization catalyst at superatmospheric pressure, reducing the pressure on the resulting mixture of polyethylene and dissolved unpolymerized ethylene to substantially atmospheric pressure to vaporize said unpolymerized ethylene and immediately thereafter adding molten wax to the resulting mixture at reduced pressure as dissolved unpolymerized ethylene vaporizes.

4. In the process for the production of a homogeneous mixture of wax and solid polyethylene wherein ethylene is polymerized in the presence of a polymerization catalyst at a superatmospheric pressure, polyethylene thus formed is separated from reaction mixture and separated polyethylene and wax are homogenized to form an intimate admixture, the improvement which comprises introducing molten wax to said polyethylene in the presence of unpolymerized ethylene and reducing the pressure on resulting mixture whereby unpolymerized ethylene in said mixture is vaporized and agitates said mixture.

5. The improved process for producing a homogeneous mixture of solid high molecular weight polymeric hydrocarbon and wax which comprises polymerizing ethylene in the presence of a polymerization catalyst at superatmospheric pressure, separating polyethylene and dissolved unreacted ethylene from the polymerization reaction mixture, reducing the pressure on said separated polyethylene and dissolved ethylene to substantially atmospheric pressure to vaporize unreacted ethylene, and immediately thereafter while said ethylene is vaporizing at reduced pressure adding molten wax to the polyethylene.

6. The process according to claim 5 wherein the wax has a melting point within the range of 90–230° F.

7. The process according to claim 5 wherein the wax employed is produced by the hydrogenation of carbon monoxide in the Fischer-Tropsch process.

8. The process according to claim 5 wherein the wax employed is a microcrystalline wax.

9. The method for producing a homogeneous intimate admixture of polyethylene and wax which comprises adding molten wax to a moving stream of polyethylene containing unpolymerized ethylene at a superatmospheric pressure, reducing the pressure on the resulting mixture to substantially atmospheric to vaporize unpolymerized ethylene and homogenizing the resulting mixture of polyethylene and wax.

10. The method for producing a homogeneous intimate mixture of polyethylene and wax which comprises forming a mixture of polyethylene and unpolymerized ethylene at a superatmospheric pressure, reducing the pressure on said mixture to substantially atmospheric pressure to vaporize unpolymerized ethylene, immediately thereafter while said unpolymerized ethylene is vaporizing adding molten wax to a moving stream of the resulting mixture at substantially atmospheric pressure and homogenizing the resulting mixture of wax and polyethylene.

11. The improved process for producing a homogeneous mixture of solid high molecular weight polyethylene and wax which comprises forming a mixture of polyethylene and dissolved ethylene at a superatmospheric pressure, reducing the pressure on said mixture of polyethylene and dissolved ethylene to substantially atmospheric pressure to vaporize said dissolved ethylene, and immediately thereafter while said dissolved ethylene is vaporizing adding molten wax to said polyethylene.

References Cited in the file of this patent

UNITED STATES PATENTS

| | | |
|---|---|---|
| 2,127,381 | Herrmann et al. | Aug. 16, 1938 |
| 2,706,719 | Newberg et al. | Apr. 19, 1955 |
| 2,857,352 | Etherington et al. | Oct. 21, 1958 |